(12) United States Patent
Wybrow et al.

(10) Patent No.: US 11,518,118 B2
(45) Date of Patent: Dec. 6, 2022

(54) DOUBLE DIAPHRAGM SHAPING OF COMPOSITE MATERIALS, ASSEMBLIES FOR SUCH SHAPING, AND RESULTING COMPOSITE MATERIALS

(71) Applicant: Cytec Industries Inc., Princeton, NJ (US)

(72) Inventors: Tim Wybrow, Ilkeston (GB); Richard Hollis, Heanor (GB); Dean Wright, Heanor (GB); Thomas Corden, Belper (GB); Darren Wells, Nottingham (GB); Alasdair Ryder, Great Casterton (GB)

(73) Assignee: CYTEC INDUSTRIES INC., Princeton, NJ (US)

( * ) Notice: Subject to any disclaimer, the term of this patent is extended or adjusted under 35 U.S.C. 154(b) by 18 days.

(21) Appl. No.: 17/347,342

(22) Filed: Jun. 14, 2021

(65) Prior Publication Data

US 2021/0299976 A1 Sep. 30, 2021

Related U.S. Application Data

(62) Division of application No. 16/484,770, filed as application No. PCT/EP2018/053132 on Feb. 8, 2018, now Pat. No. 11,034,099.

(30) Foreign Application Priority Data

Feb. 8, 2017 (GB) ........................................ 1702071
Oct. 13, 2017 (GB) ........................................ 1716869

(51) Int. Cl.
*B29C 70/00* (2006.01)
*B32B 27/00* (2006.01)
(Continued)

(52) U.S. Cl.
CPC .......... *B29C 70/345* (2013.01); *B29C 66/721* (2013.01); *B29C 66/849* (2013.01);
(Continued)

(58) Field of Classification Search
CPC ......... B29C 66/00; B29C 66/70; B29C 66/72; B29C 66/721; B29C 66/80; B29C 66/84;
(Continued)

(56) References Cited

U.S. PATENT DOCUMENTS 5,578,158 A * 11/1996 Gutowski ............... B32B 37/10
425/389
5,648,109 A * 7/1997 Gutowski ................ B30B 5/02
425/389
(Continued)

FOREIGN PATENT DOCUMENTS

CN 102202849 A 9/2011
CN 103358432 A 10/2013
(Continued)

OTHER PUBLICATIONS

Bernsdorf, M. et al., "Process & Resin Development for BMW M4 GTS hood program," SPE ACCE2016, Solvay Speaker presentations, pp. 1-23, 2016 (23 pages).

*Primary Examiner* — Jacob T Minskey
*Assistant Examiner* — Matthew Hoover
(74) *Attorney, Agent, or Firm* — Osha Bergman Watanabe & Burton LLP

(57) ABSTRACT

Disclosed herein are methods for isolating a composite material from the environment, as well as the isolated composite material. Also disclosed herein are methods for shaping a composite material that include the use of isolated composite materials. For example, disclosed is a method for mechanical thermoforming of a composite material to form a shaped composite material.

12 Claims, 3 Drawing Sheets

(51) Int. Cl.
*B29C 70/34* (2006.01)
*B29C 65/00* (2006.01)
*B29C 70/54* (2006.01)
*B32B 27/12* (2006.01)
*B29K 63/00* (2006.01)
*B29K 307/04* (2006.01)
*B29L 31/00* (2006.01)
*B29K 105/06* (2006.01)

(52) U.S. Cl.
CPC ............ *B29C 70/542* (2013.01); *B32B 27/12* (2013.01); *B29K 2063/00* (2013.01); *B29K 2105/06* (2013.01); *B29K 2307/04* (2013.01); *B29K 2995/0067* (2013.01); *B29L 2031/712* (2013.01); *B32B 2307/7242* (2013.01)

(58) Field of Classification Search
CPC ....... B29C 66/849; B29C 70/00; B29C 70/30; B29C 70/34; B29C 70/345; B29C 70/50; B29C 70/54; B29C 70/542; B32B 27/00; B32B 27/10; B32B 27/12
See application file for complete search history.

(56) References Cited

U.S. PATENT DOCUMENTS

| | | |
|---|---|---|
| 6,484,776 B1 | 11/2002 | Meilunas et al. |
| 8,071,205 B2 | 12/2011 | Tsuchiya et al. |
| 2011/0254189 A1 | 10/2011 | Doyle et al. |
| 2013/0256951 A1* | 10/2013 | Buehlmeyer ........... B29C 70/46 264/320 |

FOREIGN PATENT DOCUMENTS

| | | |
|---|---|---|
| FR | 2689809 A1 | 10/1993 |
| JP | S60500284 A | 3/1985 |
| JP | H07132514 A | 5/1995 |
| KR | 20120034240 A | 4/2012 |
| RU | 13477 U1 | 4/2000 |
| WO | 8402491 A1 | 7/1984 |

\* cited by examiner

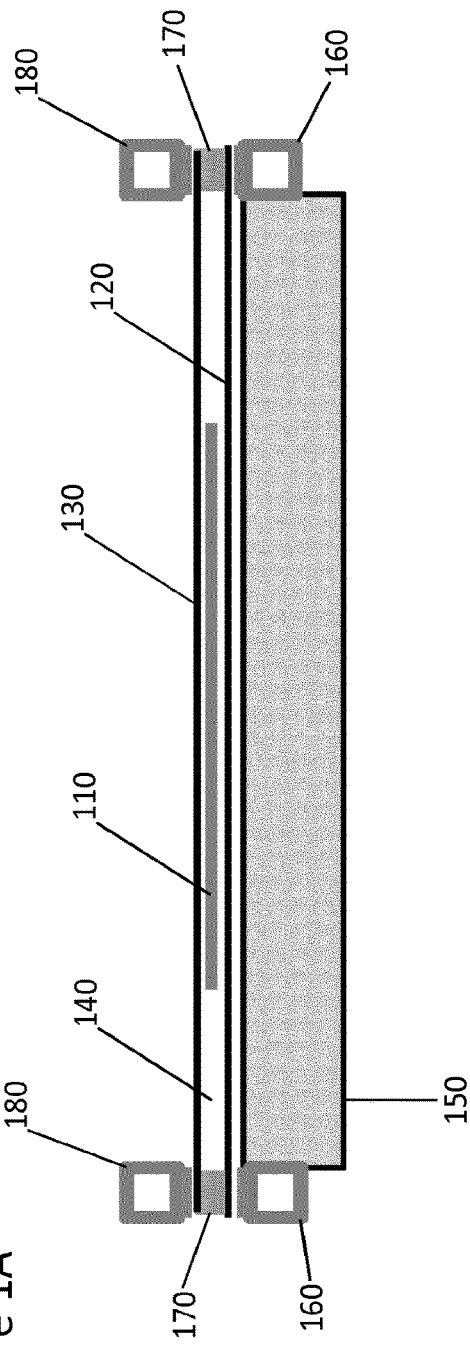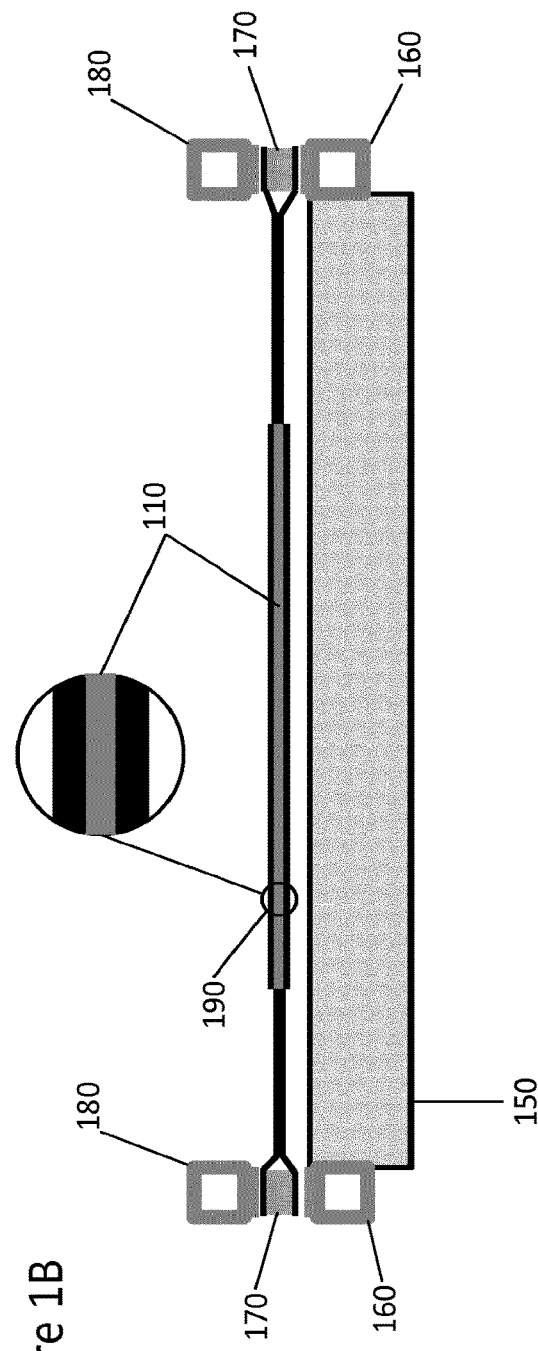
Figure 1A
Figure 1B

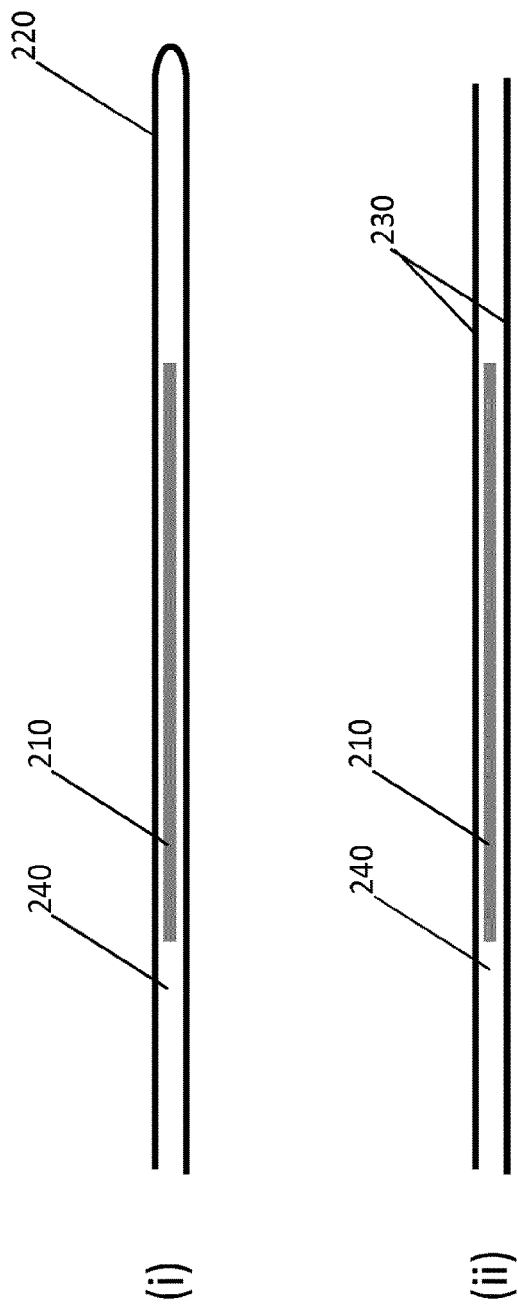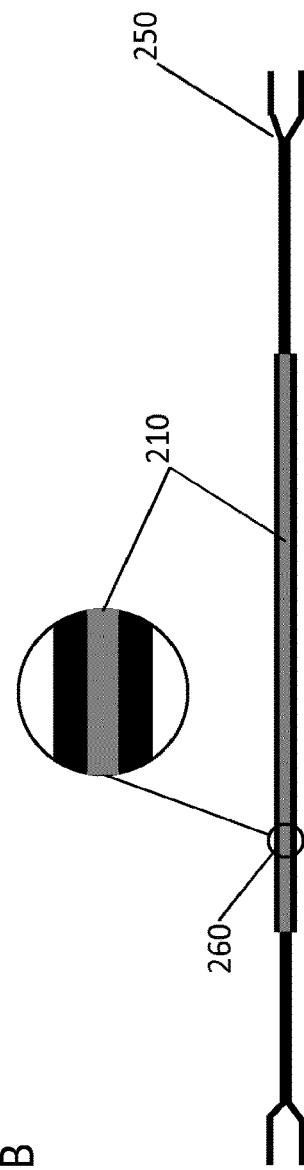
Figure 2A
Figure 2B

DOUBLE DIAPHRAGM SHAPING OF COMPOSITE MATERIALS, ASSEMBLIES FOR SUCH SHAPING, AND RESULTING COMPOSITE MATERIALS

CROSS-REFERENCE TO RELATED APPLICATION

This application is a divisional application of U.S. application Ser. No. 16/484,770, filed on Aug. 8, 2019, which is a National Stage Entry of PCT/EP2018/053132, filed on Feb. 8, 2018, which claims priority to GB Patent Application Number 1702071.0, filed on Feb. 8, 2017, and GB Patent Application Number 1716869.1, filed on Oct. 13, 2017. The entire contents of these applications are incorporated herein by reference.

BACKGROUND

Fiber-reinforced polymer composite materials have gained widespread use in many industries, such as aerospace, automotive, marine, industrial, construction, and a wide variety of consumer products. Composite materials are often preferred because they are lightweight, but still exhibit high strength and corrosion resistance, particularly in harsh environments.

Such fiber-reinforced polymer composite materials are typically made from either pre-impregnated materials or from resin infusion processes. Pre-impregnated materials, or "prepregs" are formed of fibres impregnated with a curable matrix resin, such as epoxy. The resin content in the prepreg is relatively high, typically 40%-65% by volume. Multiple plies of prepregs may be cut to size for laying up, then subsequently assembled and shaped in a molding tool. In the case where the prepreg cannot be easily adapted to the shape of the molding tool, heating may be applied to the prepregs in order to gradually deform it to the shape of the molding surface. Fiber-reinforced polymer composite materials may also be made by liquid molding processes that involve resin infusion technologies. These processes include, for example, Resin Transfer Molding (RTM), Liquid Resin Infusion (LRI), Vacuum Assisted Resin Transfer Molding (VARTM), Resin Infusion with Flexible Tooling (RIFT), Vacuum Assisted Resin Infusion (VARI), Resin Film Infusion (RFI), Controlled Atmospheric Pressure Resin Infusion (CAPRI), VAP (Vacuum Assisted Process), Single Line Injection (SLI) and Constant Pressure Infusion (CPI). In a resin infusion process, dry bindered fibers are arranged in a mold as a preform, followed by injection or infusion directly in-situ with liquid matrix resin. After injection or infusion, the resin-infused preform is cured to provide a finished composite article.

For both types of material, the process for three-dimensional shaping (or molding) of the composite material is critical to the appearance, properties and performance of the final molded product. For example, preforms are often shaped into detailed geometries using a hand layup process, which is time consuming and often results in part-to-part variation. Vacuum forming methods for shaping composite materials also exist, where differential pressure is used to aid in the formation of a shaped composite material. See, e.g., U.S. Pat. Nos. 5,578,158 and 5,648,109. However, these vacuum forming methods are generally "offline" processes, because vacuum formation is a separate process step from the curing step. Robots and/or actuators can also be used to manipulate materials as they enter a tool cavity within a press. Typically, the robot/actuators clamp around the periphery of the materials, and then move with the material as the press closes and the materials are drawn in. The aim in such processes is to maintain tension in the X and Y axes to allow for controlled forming of the composite materials. In some cases, shear pins are positioned around the outside of the tooling cavity, such the pins pierce the material that is to be formed. When the tooling is closed, tension in the X and Y axes is maintained as the materials shear or tear across the pins, but significant excess material must be used around the edge of the part. Finally, tooling can include reconfigurable pins that can be individually actuated to a desired pattern. The actuation of these reconfigurable pins, coupled with a vacuum/suction force, deforms the material. See, e.g., U.S. Pat. No. 6,484,776.

Each of the processes described above have their own disadvantages and shortcomings: for example, they are often time consuming and/or the product is still prone to out of plane wrinkling and other imperfections. Nor do these processes take into account the rheological behavior and cure characteristics of the composite materials being shaped. Moreover, the composite materials are generally exposed to environmental conditions, which can easily contaminate the final molded product. Finally, there are currently no methods that are capable of utilizing existing infrastructure and equipment, such as metal stamping or pressing presses, without additional hardware or equipment.

SUMMARY

With a goal of providing an assembly for isolating a composite material from environmental contaminants as well as a molding process that not only addresses the disadvantages and shortcomings of other methods known in the art, but also takes into consideration the rheological behavior and cure characteristics of the composite material and also allows the potential for using existing infrastructure and equipment, a new method for shaping a composite material is disclosed herein.

Accordingly, in one aspect, the present teachings provide methods for isolating a composite material from the environment. Such methods include:
(a) surrounding a substantially planar composite material with a gas-impermeable, flexible, frameless diaphragm structure, and
(b) creating a sealed pocket in the diaphragm structure, which houses the composite material alone, by removing air from between the composite material and the diaphragm structure and sealing all open edges of the diaphragm structure, such that contaminants are impeded from entering the sealed pocket without use of a frame for a period of at least about 1 month under ambient conditions.

In some embodiments, creating a sealed pocket comprises sealing all open edges of a diaphragm bag or folded diaphragm sheet disposed about the composite material. In other embodiments, creating a sealed pocket comprises sealing two diaphragm sheets around the entire periphery of the composite material.

In some embodiments, sealing all open edges of the diaphragm structure comprises mechanical sealing, application of adhesive, heat sealing, welding or any combination thereof.

In some embodiments, removing air comprises applying vacuum pressure between the composite material and the flexible diaphragm structure.

In some embodiments, the diaphragm structure comprises a film comprising one or more layers, each independently selected from a plastic layer or an elastic layer. The film can be disposable or reusable.

In some embodiments, sealing the diaphragm structure provides a seal strength sufficient to inhibit intake of contaminants during subsequent shaping of the composite material. In some embodiments, sealing the diaphragm structure provides a seal strength sufficient to inhibit intake of contaminants during shipping and handling of the composite material. In certain embodiments, contaminants are impeded from entering the sealed pocket without use of a frame for a period of up to about 6 months under ambient conditions.

In some embodiments, the sealed pocket maintains vacuum integrity for a period of at least about 1 month under ambient conditions.

In another aspect, the present teachings provide methods for shaping a composite material. Such methods include:
(a) surrounding a substantially planar composite material with a gas-impermeable, flexible, frameless diaphragm structure;
(b) creating a sealed pocket in the diaphragm structure, which houses the composite material alone, by removing air from between the composite material and the diaphragm structure and sealing all open edges of the diaphragm structure, thereby forming a layered structure, such that: air and contaminants are impeded from entering the sealed pocket without use of a frame, and the composite material is held stationary within the sealed pocket until heat, force, or a combination thereof, is applied thereto;
(c) optionally disposing the diaphragm structure within a structural frame; and
(d) shaping the composite material within the sealed pocket of the diaphragm structure.

In some embodiments, creating a sealed pocket comprises sealing all open edges of a diaphragm bag or folded diaphragm sheet disposed about the composite material. In other embodiments, creating a sealed pocket comprises sealing two diaphragm sheets around the entire periphery of the composite material.

In some embodiments, sealing all open edges of the diaphragm structure comprises mechanical sealing, application of adhesive, heat sealing, welding or any combination thereof.

In some embodiments, removing air comprises applying vacuum pressure between the composite material and the flexible diaphragm structure.

In some embodiments, the diaphragm structure comprises a film comprising one or more layers, each independently selected from a plastic layer or an elastic layer. The film can be disposable or reusable.

In some embodiments, sealing the diaphragm structure provides a seal strength sufficient to inhibit intake of contaminants for a period of time from 1 month to 6 months under ambient conditions. In other embodiments, sealing the diaphragm structure provides a seal strength sufficient to inhibit intake of contaminants during the shaping in step (c). In still other embodiments, sealing the diaphragm structure provides a seal strength sufficient to inhibit intake of contaminants during shipping and handling of the composite material. In further embodiments, sealing the diaphragm structure provides a seal strength sufficient to inhibit intake of contaminants during storage of the composite material, wherein storage occurs for up to about 6 months.

In some embodiments, the sealed pocket maintains vacuum integrity for a period of at least about 1 month under ambient conditions.

In some embodiments, the method further comprises machining the composite material according to a pattern prior to step (a).

In some embodiments, the layered structure is manipulated by automated means.

In still another aspect, the present teachings provide a method for shaping a composite material. Such method generally includes:
(a) placing a substantially planar composite material between an upper flexible diaphragm and a lower flexible diaphragm by creating a sealed pocket between the diaphragms which houses the composite material,
(b) bringing the upper flexible diaphragm and the lower flexible diaphragm into intimate contact with the composite material, thereby forming a layered structure, wherein the composite material is held stationary between the upper flexible diaphragm and the lower flexible diaphragm until heat or force is applied to the layered structure;
(c) optionally pre-heating the layered structure in a heating apparatus at a temperature sufficient to either lower the viscosity of the composite material or soften the diaphragms;
(d) positioning the layered structure in a press tool comprising a male mold and a corresponding female mold separated by a gap, wherein the male mold and the female mold each independently have a non-planar molding surface,
(e) compressing the layered structure between the male mold and the female mold by closing the gap between the male mold and the female mold; and
(f) maintaining the male mold and the female mold in a closed position until the viscosity of the layered structure reaches a level sufficient to maintain a molded shape.

In some embodiments, the composite material can be machined according to a pattern prior to step (a).

In some embodiments, step (e) comprises partially closing the gap between the male mold and the female mold such that a smaller gap is formed between the molds, which smaller gap is subsequently closed after a specific time or viscosity is reached. In some embodiments, step (e) comprises closing the gap between the male mold and the female mold at a speed of between about 0.7 mm/s and about 400 mm/s, while maintaining the male mold and the female mold at a temperature above the softening point of the composite material. In certain embodiments, step (e) is carried out until the viscosity of the composite material is less than $1.0 \times 10^8$ mPa.

In some embodiments, the male mold and the female mold are maintained at a temperature above ambient temperature. For example, in some embodiments, the male mold and the female mold are maintained at a temperature above 100° C. In some embodiments, the male mold and female mold are maintained in a closed position for between about 10 seconds and about 30 minutes.

In some embodiments, step (b) comprises applying a vacuum pressure of at least about 670 mbar between the upper flexible diaphragm and the lower flexible diaphragm.

In some embodiments, the method also includes (g) cooling the layered structure on the tool to a temperature that is below the softening temperature of the composite material. In other embodiments, the method also includes (g)

removing the layered structure from the tool while the layered structure is above the softening temperature of the composite material.

In some embodiments, the upper diaphragm and the lower diaphragm are held together by a structural frame comprising a top frame, a center frame and a bottom frame, wherein: the lower diaphragm is held between the bottom frame and the center frame; and the upper diaphragm is held between the center frame and the top frame.

The center frame can be configured to supply a source of vacuum to the assembly. In other embodiments, the upper diaphragm and the lower diaphragm are held together by a structural frame comprising a top frame and a bottom frame, wherein both the lower diaphragm and the upper diaphragm are held between the center frame and the top frame.

The material used to make the upper and lower diaphragms are generally selected based on their desired function, as described in more detail below. In some embodiments, the upper diaphragm and the lower diaphragm are each independently selected from a film comprising one or more layers, each independently selected from a rubber layer, a silicone layer and a plastic layer.

The heating apparatus may be any apparatus known in the art, and in some embodiments may be particularly selected from a contact heater or an IR heater. In some embodiments, the layered structure is positioned in the press tool and/or in the optional heating apparatus by automated means.

In some embodiments, no vacuum pressure is applied to any portion of the press tool.

In yet another aspect, the present teachings provide isolated composite materials. Such materials include a substantially planar composite material sealed within an air-evacuated pocket of a gas-impermeable, flexible, frameless diaphragm structure, wherein contaminants are impeded from entering the air-evacuated pocket for a period of at least about 1 month under ambient conditions.

In some embodiments, contaminants are impeded from entering the air-evacuated pocket during shaping of the composite material. In other embodiments, contaminants are impeded from entering the air-evacuated pocket during storage, shipping and/or handling of the composite material. In still other embodiments, contaminants are impeded from entering the air-evacuated pocket during storage of the composite material, wherein storage occurs for up to about 6 months.

In some embodiments, the air-evacuated pocket maintains vacuum integrity for a period of at least about 1 month under ambient conditions.

Composite materials for use in connection with the present teachings include structural fibers. Such structural fibers include, but are not limited to, aramid, high-modulus polyethylene (PE), polyester, poly-p-phenylene-benzobisoxazole (PBO), carbon, glass, quartz, alumina, zirconia, silicon carbide, basalt, natural fibers and combinations thereof. Composite materials for use in connection with the present teachings also include a binder or matrix material. Such binder or matrix material includes, but is not limited to thermoplastic polymers, thermoset resins, and combinations thereof.

BRIEF DESCRIPTION OF THE DRAWINGS

FIGS. 1A and 1B illustrate the formation of an exemplary framed layered structure in accordance with the present teachings.

FIGS. 2A and 2B illustrate the formation of an exemplary frameless layered structure in accordance with the present teachings.

DETAILED DESCRIPTION

Figure 3A:
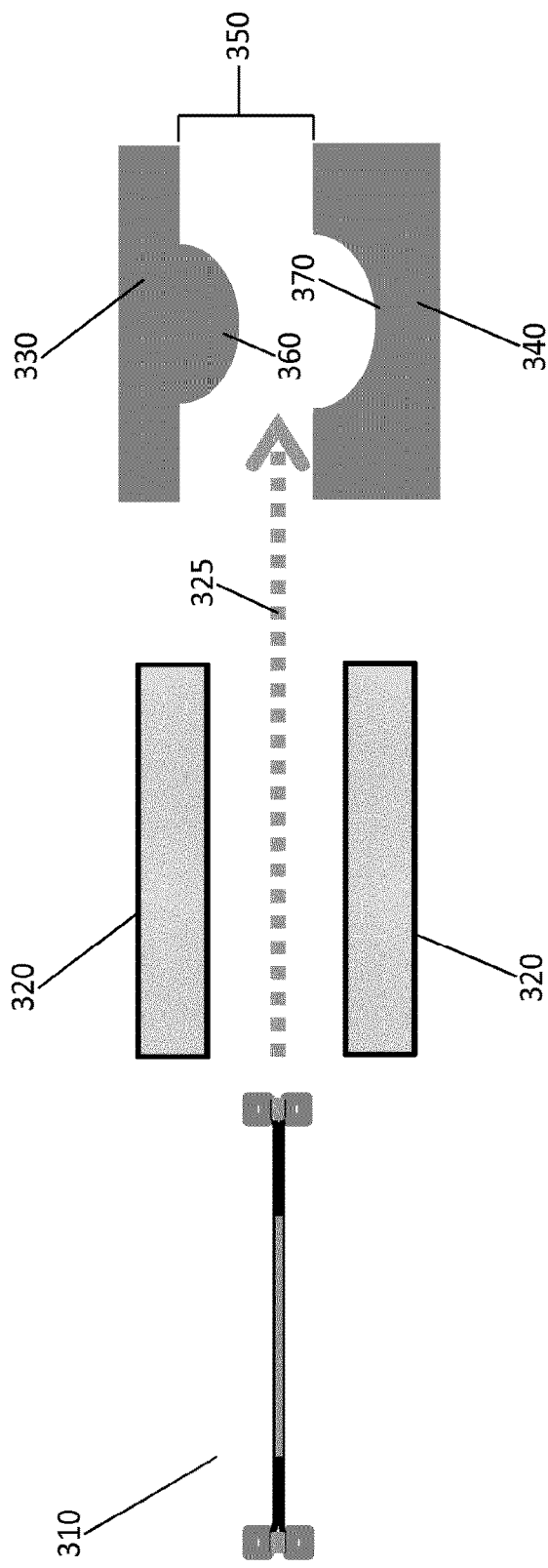
FIGS. 3A and 3B illustrate an exemplary molding process (using a framed layered structure) in accordance with the present teachings.
Figure 3B:
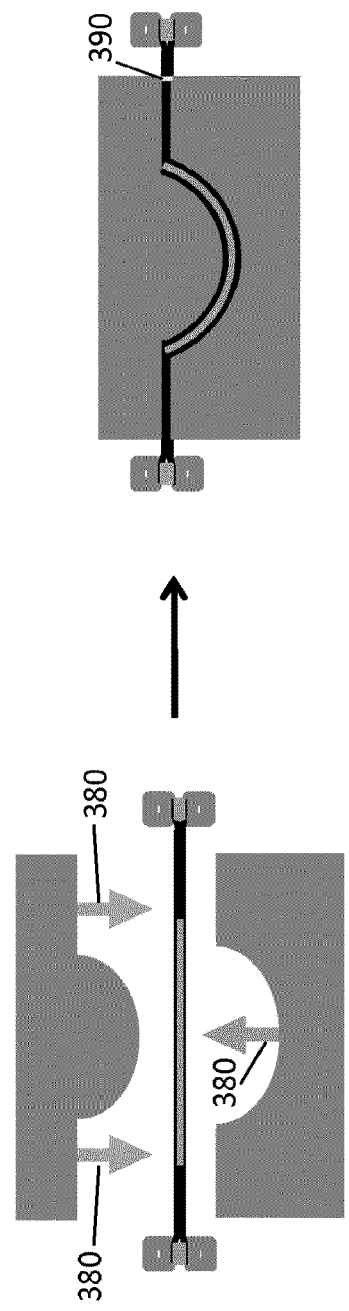

In view of the potential drawbacks of composite material processing, including processing time, part-to-part variation and product contamination, there still exists a need to develop faster, improved and more reliable assemblies and processes. It is also desirable to take rheological behavior and cure characteristics into account and, if possible, to provide a process which can take full advantage of existing equipment (e.g., metal stamps or presses). The present disclosure provides assemblies for isolating a composite material from environmental contaminants, including frameless assemblies which are suitable for storage, handling and/or transport as well as methods for shaping composite materials, including methods using a double-diaphragm mechanical thermoforming process, which—both individually and collectively—address these drawbacks.

Isolated Composite Materials

Traditional metal sheets are typically formed, e.g., into shaped products such as automotive panels, using drawing and/or stamping techniques. Because the metal is quite impervious to atmospheric influences, such as oxygen, dust and oil from the machinery, the metal can be formed into highly complex and intricate shapes without the need for isolation from such atmospheric influences in order to avoid defects during shaping. Unfortunately, the same is not typically true of composite materials. Using traditional metal stamping equipment directly on composite materials would typically result in an imperfect, uneven surface which is unacceptable in consumer products, such as automobiles. Therefore, in certain aspects, the present invention is directed to an assembly for use in the shaping of composite materials. Such assemblies isolate the composite materials, e.g., so that they can be shaped on existing metal-stamping equipment.

In some aspects, therefore, the present teachings provide methods of forming an assembly for use in shaping a composite material. Such methods, which can isolate a composite material from the environment, include:

(a) placing a substantially planar composite material between an upper flexible diaphragm and a lower flexible diaphragm by creating a pocket between the diaphragms which houses the composite material, and (b) bringing the upper flexible diaphragm and the lower flexible diaphragm into intimate contact with the composite material, thereby forming a layered structure, wherein the composite material is held stationary between the upper flexible diaphragm and the lower flexible diaphragm until heat or force is applied to the layered structure.

As used herein, the term "substantially planar" refers to a material that has one plane that is measurably larger than the other two planes (for example, at least 2, 3, 4 or 5 times larger, or more). In some embodiments, the substantially planar material has thickness variation along the largest plane. For example, the composite material may include reinforcement materials such as pad-ups (i.e., localized increases in the quantity of plies) or ply drops (i.e., localized decreases in the quantity of plies), material changes, and/or areas where the composite transitions, e.g., to fabric. In other embodiments, the substantially planar material exhibits minimal thickness variation along the area of the composite material. For example, the term substantially planar can mean that the composite material has a global thickness variation of no greater than +/−15% over 90% of the area. In some embodiments, the thickness variation is no greater than +/−10% over 90% of the area. Substantially planar is not intended to denote a perfectly flat material, but also includes materials that have slight variations in concavity and/or convexity. As used herein, the term "flexible" refers to a material capable of deformation without significant return forces. Flexible materials typically have a flexibility factor (the product of the Young's modulus measured in Pascals and the overall thickness measured in meters) of between about 1,000 N/m and about 2,500,000 N/m, for example between about 1,500 N/m and about 2,000,000 N/m, or between about 2,000 N/m and about 1,500,000 N/m.

In certain embodiments, the pocket housing the composite material is defined by a structural frame which houses the composite material held between the diaphragms. Referring now to FIG. 1A, in certain embodiments, the substantially planar composite material (110) is placed between an upper flexible diaphragm (120) and a lower flexible diaphragm (130). This creates a pocket (140) between the diaphragms which houses the composite material. In certain embodiments, this pocket would be defined by a structural frame which houses the composite material held between the diaphragms. For example, the lower flexible diaphragm can be placed onto a bed (150) which holds a bottom frame (160); the composite material (110) can be subsequently laid on top of the lower flexible diaphragm (120); a central frame (170) can then be placed on the lower diaphragm, followed by the upper flexible diaphragm (130) and finally a top frame (180). In some embodiments, the central frame may be excluded. The top, central (where present) and bottom frames maintain the desired diaphragm shape through a supported perimeter, e.g., by the positioning of clamps at predetermined intervals around the perimeter. Such top, central and bottom frames can be manufactured based on the size and shape of the composite material to be molded. Optionally, pre-manufactured structural support frames are known in the art for use with conventional metal or composite press tools (e.g., from manufacturers such as Langzauner or Schubert). In some embodiments the central frame (170) may include a means for removing air, for example a vacuum inlet or other valve. The vacuum inlet, if present, is connected to a vacuum source (e.g. a vacuum pump). In some embodiments, the pocket that houses the composite may be a sealed pocket, e.g., an airtight sealed pocket, whereby the structural frame is disposed about the entire periphery of the composite material.

Referring now to FIG. 1B, the upper flexible diaphragm (130) and the lower flexible diaphragm (120) are brought into intimate contact (see 190 and exploded view thereof) with the composite material (110), to form a layered structure. This may be accomplished for example by applying vacuum pressure between the upper flexible diaphragm and lower flexible diaphragm. In other embodiments, this may be accomplished by physically applying pressure (e.g., by hand or by mechanical means) on the upper and/or lower flexible diaphragm(s) to remove air. Vacuum pressure may be desired in certain cases, e.g., to extract residual air which may hinder molding performance, to hinder deformation or wrinkling of the composite material (or its components), to aid in maintaining fiber alignment, to provide support to the materials during the process and during shaping, and/or to maintain desired thickness at elevated temperatures. The term "vacuum pressure" as used herein refers to vacuum pressures of less than 1 atmosphere (or less than 1013 mbar). In some embodiments, the vacuum pressure between the diaphragms is set to less than about 1 atmosphere, less than about 800 mbar, less than about 700 mbar, or less than about 600 mbar. In some embodiments, the vacuum pressure between the diaphragms is set to about 670 mbar. At this point, whether by vacuum or by mechanical means, the composite material is firmly held between the diaphragms, such that it is stationary until the application of heat or force. Such stationary layered structure can be advantageous, for example, because the composite material held within the layered structure is not only maintained stationary in its location with sufficient tension across its X and Y axes, but it is also indexed. That is to say, the composite material may be placed (e.g., by automated means) in a specific position between the diaphragms within the stationary layered structure.

This indexed stationary layered structure may then be placed (e.g., by automated means) in a specific position in the press tool (as described in more detail hereinbelow), such that the press tool consistently engages a predetermined area of the composite material. A stationary layered structure may, therefore, be reliably used to produce multiple copies of a molded product without the need to index each composite material blank individually.

In some circumstances, manufacturing a framed assembly at a location other than the location of the shaping equipment could present significant, potentially insurmountable, difficulties. Weight, size and other aspects of the assembly have a tremendous effect on the ability to store and/or transport an isolated composite material. It is, therefore, advantageous or even necessary to have a frameless assembly in certain circumstances. Therefore, in some embodiments, the pocket housing the composite material is defined by the diaphragm structure itself and the present teachings provide a frameless assembly for use in shaping a composite material. Methods for isolating a composite material from the environment using a frameless assembly include:

(a) surrounding a substantially planar composite material with a gas-impermeable, flexible, frameless diaphragm structure, and (b) creating a sealed pocket in the diaphragm structure, which houses the composite material alone, by removing air from between the composite material and the diaphragm structure and sealing all open edges of the diaphragm structure, such that contaminants are impeded from entering the sealed pocket without use of a frame.

Referring now to FIG. 2, in certain embodiments the substantially planar composite material (210) is surrounded by a gas-impermeable flexible diaphragm structure. The diaphragm structure can be, for example, a bag comprising one or more open edges (220) or one or more sheets of material that are disposed about the composite material. For example, the composite material can be placed in between two sheets (230). This creates a pocket (240) within the bag or between the sheets which houses the composite material. Air is then removed from between the composite material and the diaphragm structure. This can be accomplished by applying vacuum pressure between the composite material and the diaphragm structure, by physically applying pressure (e.g., by hand or by mechanical means) to the outer surface of the diaphragm structure, or by some combination thereof. As with the framed assembly, in a frameless assembly, a particular vacuum pressure may be selected, e.g., to also hinder deformation or wrinkling of the composite material (or its components), to aid in maintaining fiber alignment, to provide support to the materials during the process and during shaping, and/or to maintain desired thickness at elevated temperatures. In some embodiments, the vacuum pressure between the diaphragm structure and the composite material is set to less than about 1 atmosphere, less than about 800 mbar, less than about 700 mbar (e.g., about 670 mbar), or less than about 600 mbar. The diaphragm structure is then sealed (260) to form a sealed pocket within the diaphragm structure which houses the composite material within a layered structure (250), such that contaminants are impeded from entering the sealed pocket without use of a frame. As used herein, the term "contaminants" refers to air, particulates, oil, and any other contaminant that could substantially affect the surface properties or mechanical properties of the composite material. In some embodiments, the air is removed and the open edges are sealed in a single step. For example, air can be removed and edges may be sealed at the same time using mechanical pressure. In other embodiments, the air is removed and the open edges are sealed in discrete steps. For example, air can be removed using a vacuum, followed by sealing using mechanical or other means.

In some embodiments, contaminants are impeded from entering the sealed pocket without use of a frame for a period of at least about 1 month under ambient conditions. In certain embodiments, contaminants are impeded from entering the sealed pocket without use of a frame for a period of at least about 2, 3, 4 or even 5 months under ambient conditions. In some embodiments, contaminants are impeded from entering the sealed pocket without use of a frame for a period of up to about 6 months under ambient conditions; however in certain embodiments, contaminants may be impeded from entering the sealed pocket without use of a frame for a period of greater than 6 months under ambient conditions. In certain embodiments, contaminants are impeded from entering the sealed pocket without use of a frame for a period of at least about 2 months under low temperature conditions, i.e., −18° C. or less. In certain embodiments, contaminants are impeded from entering the sealed pocket without use of a frame for a period of at least about 4, 6, 8, 10 or even 12 months under low temperature conditions.

The materials and methods used to create a sealed pocket will depend on the nature and shape of the diaphragm material used in the diaphragm structure. For example, if the diaphragm structure is a bag, creating a sealed pocket refers to placing the composite material in the interior of the bag and sealing the open edge of the bag. If the diaphragm structure is a folded sheet, creating a sealed pocket refers to sealing the three open edges of the folded sheet, with the composite material being disposed within the fold of the sheet. If, on the other hand, the diaphragm structure is two diaphragm sheets, creating a sealed pocket refers to sealing the four open edges of the two diaphragm sheets, with the composite material disposed between the two sheets (i.e., sealing around the entire periphery of the composite material). In all cases, each open edge may be sealed in a straight line, or in any non-linear manner.

Additionally, a number of methods for sealing the diaphragm materials (in the absence of a structural frame) can be utilized. For example, the open edges of the diaphragm structure can be mechanically sealed. In other embodiments, the open edges of the diaphragm structure can be sealed using adhesive. In other embodiments, the open edges of the diaphragm structure can be welded. In still other embodiments, the open edges of the diaphragm structure can be sealed using heat.

Sealing the composite material in the pocket of the diaphragm structure not only impedes contaminants under static, ambient conditions, but also can impede contaminants under dynamic circumstances. In some embodiments, sealing the diaphragm structure provides a seal strength sufficient to inhibit intake of contaminants during subsequent shaping of the composite material. In some embodiments, sealing the diaphragm structure provides a seal strength sufficient to inhibit intake of contaminants during storage, shipping and/or handling of the composite material.

A frameless assembly capable of impeding contaminants can also be capable of maintaining a vacuum. Therefore, at this point—and similar to a framed assembly—the composite material is firmly held within the sealed pocket, and can be held stationary until the application of heat or force. In particular, in some embodiments, the sealed pocket maintains vacuum integrity for a period of at least about 1 month under ambient conditions. In certain embodiments, the sealed pocket maintains vacuum integrity for a period of at least about 2, 3, 4, 5 or 6 months, or more, under ambient conditions. As used herein, the term "vacuum integrity" refers to the ability of the frameless assembly to substantially retain negative pressure within the sealed pocket. When the sealed pocket maintains vacuum integrity, the composite material is maintained stationary in its location within the frameless assembly, with sufficient tension across its X and Y axes, and is also indexed (i.e., in a specific position within the frameless assembly). In some embodiments, this indexed frameless assembly can have the same advantages as the stationary layered structure defined in the context of a framed assembly. In other words, the indexed frameless assembly may be placed in a specific position in the press tool, such that the press tool consistently engages a predetermined area of the composite material. In some embodiments, however, the frameless assembly will be disposed within a structural frame prior to shaping the composite material. The use of an indexed frameless assembly would also provide significant advantages when used with a structural frame, not only in terms of the storage and shipping capabilities discussed in detail above, but also during shaping. In particular, the indexed frameless assembly may be reliably used—without the need for additional indexing—with a structural frame, even after storage, handling, and/or shipping.

Diaphragm Materials and Diaphragm Structures

As used herein, the term "diaphragm" refers to any barrier that divides or separates two distinct physical areas. The term "diaphragm structure" refers to an assembly of one or more diaphragms that define an exterior space and an isolated interior space, e.g., the area within a sealed pocket and the area outside of the sealed pocket. The diaphragms are flexible and may be either elastic or non-elastically deformable sheets of material. Typically, diaphragm thickness ranges between about 10 microns and about 200 microns, for example, between about 20 microns and about 150 microns. Particularly advantageous diaphragms have a thickness of between about 30 microns and about 100 microns. In some embodiments, the material used to make the diaphragms is not particularly limited and can be, for example, rubbers, silicones, plastics, thermoplastics, or similar materials. In certain embodiments, however, the material used to make the diaphragms includes a film comprising one or more layers, each independently selected from a plastic layer or an elastic layer. The diaphragms may be comprised of a single material or may include multiple materials, e.g., arranged in layers. The upper diaphragm and the lower diaphragm of a diaphragm structure, for example, can each independently be selected from a film comprising one or more layers, each individual layer being the same as or different than the other layers in the diaphragm. Diaphragm material can be formed into a film using conventional casting or extrusion procedures. In some embodiments, the film is disposable. In other embodiments, the film is reusable.

The diaphragm material can also be chosen to have a number of properties, depending upon the desired function. For example, in some embodiments, the diaphragm is self-releasing. That is, the diaphragm can easily release from the final molded part and/or the molded assembly can easily release from the tooling. In other embodiments, the diaphragm is designed to temporarily (or lightly) adhere to the molded composite material. Such temporary adhesion may be advantageous to protect the final molded part, e.g., during subsequent processing, transport and/or storage. In still other embodiments, the diaphragm is designed to permanently adhere to the molded composite material. Such temporary adhesion may be advantageous to provide a permanent protective coating and/or paint coating to the final molded part. The diaphragm material may be chosen based on its specific physical properties. For example, in some embodiments, the material used to make the diaphragms has an elongation to failure of above 100%. In some embodiments, the material used to make the diaphragms has a melting temperature that is similar to (e.g., within 10° C. of) the molding temperature of the composite material.

In some embodiments, the diaphragms are permeable to air. In other embodiments, the diaphragms are impermeable to air, such that together they are able to form a sealed pocket. The sealed pocket impedes contaminants (e.g., air, particulates, oil, etc.) from entering the sealed pocket for a period of time. In some embodiments, the impermeable diaphragms form an airtight sealed pocket. As used herein, the term "airtight" refers to the ability of a material to hold a vacuum for the duration of the tooling process. This airtight sealed pocket is advantageous, for example, when a vacuum is used to place the upper and lower diaphragms in intimate contact with the composite material.

Composite Materials

As used herein, the term "composite material" refers to an assembly of structural fibers and a binder or matrix material. Structural fibers may be organic fibers, inorganic fibers or mixtures thereof, including for example commercially available structural fibers such as carbon fibers, glass fibers, aramid fibers (e.g., Kevlar), high-modulus polyethylene (PE) fibers, polyester fibers, poly-p-phenylene-benzobisoxazole (PBO) fibers, quartz fibers, alumina fibers, zirconia fibers, silicon carbide fibers, other ceramic fibers, basalt, natural fibers and mixtures thereof. It is noted that end uses that require high-strength composite structures would typically employ fibers having a high tensile strength (e.g., ≥3500 MPa or ≥500 ksi). Such structural fibers may include one or multiple layers of fibrous material in any conventional configuration, including for example, unidirectional tape (uni-tape) webs, non-woven mats or veils, woven fabrics, knitted fabrics, non-crimped fabrics, fiber tows and combinations thereof. It is to be understood that structural fibers may be included as one or multiple plies across all or a portion of the composite material, or in the form of pad-ups or ply drops, with localised increases/decreases in thickness.

The fibrous material is held in place and stabilized by a binder or matrix material, such that alignment of the fibrous material is maintained and the stabilized material can stored, transported and handled (e.g., shaped or otherwise deformed) without fraying, unraveling, pulling apart, buckling, wrinkling or otherwise reducing the integrity of the fibrous material. Fibrous materials held by a small amount of binder (e.g., typically less than about 10% by weight) are typically referred to as fibrous preforms. Such preforms would be suitable for resin infusion applications, such as RTM. Fibrous materials may also be held by larger amounts of matrix materials (generally called "prepregs" when referring to fibers impregnated with a matrix), and would thus be suitable for final product formation without further addition of resin.

The binder or matrix material is generally selected from thermoplastic polymers, thermoset resins, and combinations thereof. When used to form a preform, such thermoplastic polymers and thermoset resins may be introduced in various forms, such as powder, spray, liquid, paste, film, fibers, and non-woven veils. Means for utilizing these various forms are generally known in the art.

Thermoplastic materials include, for example, polyesters, polyamides, polyimides, polycarbonates, poly(methyl methacrylates), polyaromatics, polyesteramides, polyamideimides, polyetherimides, polyaramides, polyarylates, polyaryletherketones, polyetheretherketones, polyetherketoneketones, polyacrylates, poly(ester) carbonates, poly(methyl methacrylates/butyl acrylates), polysulphones, polyarylsulphones, copolymers thereof and combinations thereof. In some embodiments, the thermoplastic material may also include one or more reactive end groups, such as amine or hydroxyl groups, which are reactive to epoxides or curing agents.

Thermoset materials include, for example, epoxy resins, bismaleimide resins, formaldehyde-condensate resins (including formaldehyde-phenol resins), cyanate resins, isocyanate resins, phenolic resins and mixtures thereof. The epoxy resin may be mono or poly-glycidyl derivative of one or more compounds selected from the group consisting of aromatic diamines, aromatic monoprimary amines, aminophenols, polyhydric phenols, polyhydric alcohols, and polycarboxylic acids. The epoxy resins may also be multifunctional (e.g., di-functional, tri-functional, and tetra-functional epoxies).

In some embodiments, a combination of thermoplastic polymer(s) and thermoset resin(s) are used in the composite material. For example, certain combinations may operate with synergistic effect concerning flow control and flexibility. In such combinations, the thermoplastic polymers would provide flow control and flexibility to the blend, dominating the typically low viscosity, brittle thermoset resins.

Double Diaphragm Processes for Shaping Composite Material

The present teachings also include methods for shaping composite materials using the assemblies provided herein. In some embodiments, the methods include the use of a framed assembly and in other embodiments, the methods include the use of a frameless assembly. In still other embodiments, the methods can use either a framed or a frameless assembly.

In some aspects, therefore, the present teachings provide methods for shaping a composite material that generally include:

(a) surrounding a substantially planar composite material with a gas-impermeable, flexible, frameless diaphragm structure;

(b) creating a sealed pocket in the diaphragm structure, which houses the composite material alone, by removing air from between the composite material and the diaphragm structure and sealing all open edges of the diaphragm structure, thereby forming a layered structure, such that:

contaminants are impeded from entering the sealed pocket without use of a frame, and the composite material is held stationary within the sealed pocket until heat, force or a combination thereof is applied thereto;

(c) optionally disposing the diaphragm structure within a structural frame; and (d) shaping the composite material within the sealed pocket of the frameless diaphragm structure.

Shaping the composite material in step (d) can include vacuum thermoforming, mechanical thermoforming, or a combination thereof.

Vacuum thermoforming generally includes (a") positioning the layered structure over a housing with a mold positioned therein, the mold having a non-planar molding surface, so as to define a sealed chamber bounded by the diaphragm structure and the housing, and such that the lower diaphragm is positioned above the molding surface;

(b") optionally heating the layered structure at a temperature sufficient to either lower the viscosity of the composite material and/or soften the diaphragm structure (c") creating a vacuum inside the sealed chamber between the diaphragm structure and the housing by removing air, whereby the layered structure is pulled toward the molding surface and eventually conforms thereto, (d") maintaining the vacuum until the viscosity of the layered structure reaches a level sufficient for the composite material to maintain a molded shape General parameters known in the art for vacuum thermoforming can be used. For example, in some embodiments, air is removed in step (c") at a rate of 1 mbar/15 mins or faster until a vacuum pressure of 950 mbar or below is reached. In other embodiments, heating is maintained while air is removed in step (c").

In some embodiments, the vacuum thermoforming further includes cooling the layered structure on the mold to a temperature that is below the softening temperature of the composite material. In yet other embodiments, the vacuum thermoforming further includes (e") removing the layered structure from the tool while the layered structure is above the softening temperature of the composite material.

Mechanical thermoforming, on the other hand, can include (a') optionally pre-heating the layered structure in a heating apparatus at a temperature sufficient to lower the viscosity of the composite material, to soften the diaphragm structure, or both;

(b') positioning the layered structure in a press tool comprising a male mold and a corresponding female mold separated by a gap, wherein the male mold and the female mold each independently have a non-planar molding surface, (c') compressing the layered structure between the male mold and the female mold by closing the gap between the male mold and the female mold; and (d') maintaining the male mold and the female mold in a closed position until the viscosity of the layered structure reaches a level sufficient for the composite material to maintain a molded shape.

It is particularly noted that the mechanical thermoforming methods described above can be used in combination with either a framed assembly or a frameless assembly. For example, in some embodiments, the present teachings provide methods for shaping a composite material that generally include:

(a°) optionally pre-heating a layered structure, the layered structure comprising a composite material disposed within a diaphragm structure, in a heating apparatus at a temperature sufficient to either lower the viscosity of the composite material or soften the diaphragms;

(b°) positioning the layered structure in a press tool comprising a male mold and a corresponding female mold separated by a gap, wherein the male mold and the female mold each independently have a non-planar molding surface, (c°) compressing the layered structure between the male mold and the female mold by closing the gap between the male mold and the female mold; and (d°) maintaining the male mold and the female mold in a closed position until the viscosity of the layered structure reaches a level sufficient to maintain a molded shape.

In still other embodiments, the present teachings provide methods for shaping a composite material that generally include:

(a) placing a substantially planar composite material between an upper flexible diaphragm and a lower flexible diaphragm by creating a sealed pocket between the diaphragms which houses the composite material, (b) bringing the upper flexible diaphragm and the lower flexible diaphragm into intimate contact with the composite material, thereby forming a layered structure, wherein the composite material is held stationary between the upper flexible diaphragm and the lower flexible diaphragm until heat or force is applied to the layered structure;

(c) optionally pre-heating the layered structure in a heating apparatus at a temperature sufficient to either lower the viscosity of the composite material or soften the diaphragms;

(d) positioning the layered structure in a press tool comprising a male mold and a corresponding female mold separated by a gap, wherein the male mold and the female mold each independently have a non-planar molding surface, (e) compressing the layered structure between the male mold and the female mold by closing the gap between the male mold and the female mold; and (f) maintaining the male mold and the female mold in a closed position until the viscosity of the layered structure reaches a level sufficient to maintain a molded shape.

Referring now to FIG. 3A, the layered structure (310) may, in some cases, be pre-heated in a heating apparatus (320). The layered structure can be placed in the heating apparatus manually or by automated means, e.g., using an automated shuttle (325). This heating apparatus can be any heater that can be used in the formation or molding of metal or composite material products, for example, a contact heater or an infrared (IR) heater. In some cases this pre-heating softens the upper flexible diaphragm and the lower flexible diaphragm, e.g., so that they are more pliable during formation of the final molded product. In some cases, this pre-heating brings the composite material held within the layered structure to a desired viscosity or temperature. Pre-heating may occur in a heating apparatus heated to a temperature of above about 75° C., 100° C., 125° C., 150° C., 175° C., 200° C. or even higher. This temperature can be adjusted, for example, depending upon the identity of the diaphragms and/or components in the composite material.

Such pre-heating is advantageous, for example, if it is desired to minimize or eliminate heating of the press tool and/or to minimize the amount of time that the layered structure resides within the press tool.

In order to form the final molded product, the layered structure is positioned in a press tool. In some embodiments, no vacuum pressure is applied to any portion of the press tool. In other embodiments, localized vacuum is applied to the tool surface, for example to remove entrapped air between the layered structure and the tool. In such embodiments, however, the vacuum is typically not used as a force to form the shape of the final molded product. The layered structure can be placed in the press tool manually or by automated means, e.g., using an automated shuttle (325). This press tool generally includes a male mold (330) and a female mold (340), which are separated by a gap (350). Each mold has a non-planar molding surface (360 and 370, respectively). The molding surfaces are fixed, i.e., not reconfigurable. The molding surfaces are also typically matched, i.e., the male mold corresponding approximately to the opposite of the female mold; and in some embodiments may be perfectly matched. However, in some embodiments, the male and female molds are such that, when closed, the thickness between them varies. In certain embodiments, the layered structure is positioned in the gap at a specific, predetermined distance between the male mold and the female mold. Referring to FIG. 2B, the layered structure is then compressed between the male mold and the female mold, by closing the gap (380). In some embodiments, this is accomplished by partially closing the gap between the male mold and the female mold to form a smaller gap between the molds. This smaller gap is subsequently closed after a specific time or viscosity is reached. It is understood that "closing the gap" refers to compressing the molds such that a pre-determined final cavity thickness along the Z axis (390) is obtained between them. Final cavity thickness can be adjusted, e.g., by controlling where the molds stop in relation to each other, and the choice of thickness can be made by the operator of the molds and will depend on the nature of the final molded product. In some embodiments, the final cavity thickness is substantially uniform, i.e., the process produces a two-sided molded final product with a thickness that varies by less than 5%. In some embodiments, the process produces a final molded product with a thickness that varies by less than about 4%, e.g., less than about 3%, less than about 2% or even less than about 1%. In other embodiments, the male and female tools may be configured to provide a cavity thickness that purposely varies across the X and Y axes.

In certain embodiments, the male mold and the female mold are maintained at a temperature above ambient temperature. For example, they may be maintained at a temperature of above about 75° C., 100° C., 125° C., 150° C., 175° C., 200° C. or even higher. This temperature can be adjusted depending upon the identity (and the viscosity) of the components in the composite material. The molds, for example, can be maintained at a temperature above the softening point of the binder or matrix material used in the composite material. In some embodiments, the composite material comprises a thermoset material and molds are maintained at temperatures between about 100° C. and 200° C. In other embodiments, composite material comprises a thermoplastic material and the molds are maintained at temperatures above about 200° C. Typically, the layered structure will be heated at some point, for example during the pre-heating step or during the molding process in the press tool or both, to enable softening of the composite material. The binder or matrix material in the composite material is in a solid phase at ambient temperature (20° C.-25° C.), but will soften upon heating. This softening allows molding of the composite material in the press tool.

In some embodiments, the male mold and the female mold are maintained in a closed position for a predetermined time. For example, in some embodiments, the molds are heated and maintained in a closed position until a desired viscosity or temperature is reached. In some embodiments, the molds are maintained in a closed position until the viscosity of the composite material is less than about $1.0 \times 10^8$ mPa. In some embodiments, the molds are heated and maintained in a closed position until the binder or matrix material begins to cross-link. In other embodiments, the molds are not heated, but are maintained in a closed position for a period of time sufficient for the material to maintain a molded shape. Molds may be maintained in a closed position, e.g., for between about 5 seconds and about 60 minutes, for example, for between about 10 seconds and about 30 minutes or between about 15 seconds and about 15 minutes. The length of time that the molds are maintained in a closed position will depend upon a number of factors, including the identity of the composite material and the temperature of the molds.

In certain embodiments, the male mold is driven through the layered structure, while the female mold remains static. In other embodiments, the female mold does not remain static, but moves at a rate that is slower than the male mold (such that the male mold still acts predominantly as the forming surface). In still other embodiments, both molds move at approximately the same rate of speed to close the gap between the molds. The molds are driven at a rate and to a final pressure sufficient to deform/mold the composite material. For example, the molds may be driven at a rate of between about 0.4 mm/s and about 500 mm/s, e.g., between about 0.7 mm/s and about 400 mm/s, e.g., between about 10 mm/s and about 350 mm/s or between about 50 mm/s and 300 mm/s. Additionally, the molds may be driven to a final pressure of between about 100 psi and about 1000 psi, e.g., between about 250 psi and about 750 psi. In some embodiments, the molds are driven at a rate and to a final pressure that have been selected to control the thickness of the final molded product while avoiding the formation of wrinkles and the distortion of structural fibers. In addition, the molds may be driven at a rate and to a final pressure that have been selected to allow the rapid formation of final molded parts.

The layered structure is then cooled to below the softening temperature of the binder or matrix material. This can occur while the layered structure remains on the press tool, or after the layered structure is removed from the press tool. At this point, the binder or matrix material returns to a solid phase and the composite material retains its newly formed geometry. If the composite material is a preform, such preform will hold its desired shape for subsequent resin infusion.

The present method can reduce the requirement of post-cure machining to achieve the final geometry of structural parts. This post-cure processing is not only time-consuming, but also very risky because cured structural parts cannot be re-shaped. Therefore, damage incurred during post-cure processing can result in the part being scrapped. Thus, in some embodiments, the present process includes the step of machining the composite material prior to placing it between the upper and lower diaphragms. This allows for automated, efficient and easy machining of the composite material, instead of a complex process of programming, positioning, and cutting of a cured three-dimensional composite material.

The double-diaphragm arrangement described above not only aids in the molding of composite materials, e.g., by maintaining the composite material in a stationary position with sufficient tension across its X and Y axes, but also provides significant additional functional advantages. For example, the arrangement protects the composite material blank from environmental contaminants, such as impurities in the air or on the tooling machinery. This protection enables the (otherwise unmanageable) use of conventional press tools that are capable of significantly more complex three dimensional geometries than either vacuum formation or reconfigurable tool technologies. Furthermore, the use of the double-diaphragm arrangement can allow the mold release process to be eliminated from the total process. Moreover, it provides a final molded product that can, if desired, maintain the diaphragm layer, either temporarily or permanently. For example, a temporary layer may be desired, e.g., for a release coating, whereas a permanent coating may be desired, e.g., for corona treatment or bonding of the diaphragm material to the molded part. The function the diaphragms will depend on the diaphragm material used, discussed in more detail below. The double diaphragm mechanical thermoforming process described herein, therefore, provides an effective and efficient means for producing complex three-dimensional composite structures in an automated fashion. Three-dimensional composite structures can be produced quickly, repeatedly and on a large-scale. For example, three-dimensional composite structures can be formed from substantially planar composite material blanks in 1-10 minute cycles. Such quick, repeatable processes are suitable for the manufacture of automotive parts and paneling, such as hoods, trunks, door panels, fenders and wheel wells.

EXAMPLES

The following examples are for illustration purposes only, and are not to be construed as limiting the scope of the appended claims.

Example 1: Double Diaphragm Mechanical Thermoforming, Framed

A lower flexible diaphragm made of a plastic film (Solvay, formerly Cytec Industries, EMX045) was vacuumed onto a bed holding a bottom frame. A composite material blank made of a carbon-fiber reinforced epoxy (Solvay, formerly Cytec Industries, MTM710-1) was laid on top of the lower flexible diaphragm, followed by center frame having a vacuum inlet. An upper flexible diaphragm made of the same film as the lower flexible diaphragm was then placed such that it covered the center frame and composite material blank. The top, center and bottom frames were clamped together, thereby creating a vacuum tight seal and a sealed pocket bounded by the lower flexible diaphragm, the upper flexible diaphragm and the center frame. A vacuum was then applied to remove air from between the upper flexible diaphragm and the lower flexible diaphragm, until the vacuum pressure reached 670 mbar. At that point, the composite material blank was firmly supported by both diaphragms, creating a stationary layered structure.

The layered structure was then shuttled into a contact heating apparatus, where it was heated to 120° C. Once the layered structure temperature reached 120° C., it was shuttled into a press tool comprising a matched male mold and female mold, configured in the shape of a structural automotive door component. The male mold was then driven toward the female mold at a rate of approximately 200 mm/s. The female mold remained stationary, and both molds were held at 140° C. until cross linking had begun. The shaped structure was removed from the press tool while still hot and allowed to cool after removal.

The process for shaping the composite material blank was 10 minutes from start to finish (i.e., first placement of the lower flexible diaphragm to establishment of final shape).

Example 2: Frameless Isolation of Composite Material

A flat composite material blank made of a carbon-fiber reinforced epoxy (Solvay, formerly Cytec Industries, Solvalite™ 710-1) was disposed between two sheets of an 80 micron plastic film (Solvay, formerly Cytec Industries, EMX045). After removing air from between the sheets of plastic film, the sheets was sealed together at around 140° C., with a total heat up and cool down duration of approximately 8 seconds. Once cooled below 80° C., the layered structure formed by the two sheets disposed about the composite material blank was found to have adequate strength and sufficient weld characteristics. The sealed flat blanks were stored for 4 days at 21° C. and 6 months at −18° C., in each case with no observed intrusion of contaminants.

The same process was done using flat composite material blank made of a carbon-fiber reinforced ester (Solvay, formerly Cytec Industries, Solvalite™730). The sealed flat blank was stored in a stack at 21° C. for 18 months with no observed intrusion of contaminants.

Prospective Example 3: Double Diaphragm Mechanical Thermoforming using Frameless Blank The sealed flat blanks prepared in accordance with Example 2 which include Solvalite™ 710-1, after storage, will be placed within a structural frame, such that the frame is disposed around the periphery of the composite material blank and the composite material blank is firmly supported by both sheets of film and the frame. This structure will then be shuttled into a contact heating apparatus, where it will be heated to 120° C. Once the layered structure temperature reaches 120° C., it will be shuttled into a press tool comprising a matched male mold and female mold, configured in a desired three dimensional shape. The male mold will then be driven toward the female mold at a rate of approximately 200 mm/s. The female mold will remain stationary, and both molds will be held at 140° C. until cross linking begins. The shaped structure will be removed from the press tool while still hot and will be allowed to cool after removal.

It is anticipated that the process for shaping the composite material blank will be significantly less than 10 minutes from start to finish (i.e., placement of the sealed flat blank into the frame to establishment of final shape).

The invention claimed is:
1. A method for isolating a composite material from the environment, the method comprising:
   (a) surrounding a substantially planar composite material with a gas-impermeable, flexible, frameless diaphragm structure, and
   (b) creating a sealed pocket in the diaphragm structure, which houses the composite material alone, by removing air from between the composite material and the diaphragm structure and sealing all open edges of the diaphragm structure, such that contaminants are impeded from entering the sealed pocket without use of a frame for a period of at least about 1 month under ambient conditions.

2. The method of claim 1, wherein creating a sealed pocket comprises sealing all open edges of a diaphragm bag or folded diaphragm sheet, disposed about the composite material.

3. The method of claim 1, wherein creating a sealed pocket, comprises sealing two diaphragm sheets around the entire periphery of the composite material.

4. The method of claim 1, wherein sealing all open edges of the diaphragm structure comprises mechanical sealing, application of adhesive, heat sealing, welding or any combination thereof.

5. The method of claim 1, wherein removing air comprises applying vacuum pressure between the composite material and the flexible diaphragm structure.

6. The method of claim 1, wherein the diaphragm structure comprises a film comprising one or more layers, each independently selected from a plastic layer or an elastic layer.

7. The method of claim 6, wherein the film is disposable.

8. The method of claim 6, wherein the film is reusable.

9. The method of claim 1, wherein sealing the diaphragm structure provides a seal strength sufficient to inhibit intake of contaminants during subsequent shaping of the composite material.

10. The method of claim 1, wherein sealing the diaphragm structure provides a seal strength sufficient to inhibit intake of contaminants during shipping and handling of the composite material.

11. The method of claim 1, wherein contaminants are impeded from entering the sealed pocket without use of a frame for a period of up to about 6 months under ambient conditions.

12. The method of claim 1, wherein the sealed pocket maintains vacuum integrity for a period of at least about 1 month under ambient conditions.

* * * * *